US008878880B2

(12) United States Patent
Otsuki et al.

(10) Patent No.: US 8,878,880 B2

(45) Date of Patent: Nov. 4, 2014

(54) METHOD OF DRIVING ELECTROPHORETIC DISPLAY DEVICE CAPABLE OF DISPLAYING IMAGE DATA APPROXIMATED TO ORIGINAL IMAGE DATA, ELECTROPHORETIC DISPLAY DEVICE, AND ELECTRONIC APPARATUS

(75) Inventors: Tetsuaki Otsuki, Suginami-ku (JP); Kota Muto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 349 days.

(21) Appl. No.: 13/081,594

(22) Filed: Apr. 7, 2011

(65) Prior Publication Data

US 2011/0249041 A1 Oct. 13, 2011

(30) Foreign Application Priority Data

Apr. 12, 2010 (JP) ................................ 2010-091171

(51) Int. Cl.

*G09G 5/10* (2006.01)
*G09G 3/34* (2006.01)
*G02F 1/167* (2006.01)
*G06T 13/40* (2011.01)
*G06T 13/00* (2011.01)
*G06T 1/60* (2006.01)

(52) U.S. Cl.

CPC ........ *G09G 3/344* (2013.01); *G09G 2320/0285* (2013.01); *G09G 2300/0857* (2013.01)

USPC ........... 345/690; 345/107; 345/474; 345/475; 345/574; 345/596

(58) Field of Classification Search

CPC ....................................................... G09G 5/10

See application file for complete search history.

(56) References Cited

U.S. PATENT DOCUMENTS

| | | | | |
|---|---|---|---|---|
| 2005/0024710 | A1 | 2/2005 | Kanbe | |
| 2006/0187185 | A1* | 8/2006 | Yoshinaga et al. | 345/107 |
| 2006/0262080 | A1* | 11/2006 | Matsuda | 345/107 |
| 2008/0309953 | A1* | 12/2008 | Feng | 358/1.9 |
| 2009/0237392 | A1* | 9/2009 | Kajino | 345/214 |
| 2010/0039451 | A1* | 2/2010 | Jung | 345/690 |
| 2010/0066657 | A1* | 3/2010 | Park et al. | 345/94 |

FOREIGN PATENT DOCUMENTS

| | | | | |
|---|---|---|---|---|
| JP | 2005208314 A | * 8/2005 | | G09G 3/36 |
| JP | 2007-148441 A | 6/2007 | | |

* cited by examiner

*Primary Examiner* — Joseph Feild
*Assistant Examiner* — K. Kiyabu
(74) *Attorney, Agent, or Firm* — ALG Intellectual Property, LLC

(57) ABSTRACT

A method of driving an electrophoretic display device includes changing the gradation level of image data on the basis of correction data corresponding to the gradation level, converting image data with the changed gradation level to a dithering pattern, in which the first color and the second color are combined, corresponding to the changed gradation level for each predetermined region of image data, and driving the electrophoretic particles of the first color and the electrophoretic particles of the second color on the basis of image data converted to the dithering pattern for the plurality of pixels in the display section.

8 Claims, 19 Drawing Sheets

121

| GRADATION LEVEL (121a) | GRADATION LEVEL AFTER CORRECTION (121b) |
|---|---|
| 0 | 0 |
| 1 | 0.0626 |
| 2 | 0.0886 |
| 3 | 0.1085 |
| ⋮ | ⋮ |
| 255 | 1 |

FIG. 16

122

| GRADATION LEVEL (122a) | GRADATION LEVEL AFTER CORRECTION (122b) |
|---|---|
| 0 | 0 |
| 1 | 0 |
| 2 | 0 |
| 3 | 0.0014 |
| ⋮ | ⋮ |
| 255 | 1 |

FIG. 17

METHOD OF DRIVING ELECTROPHORETIC DISPLAY DEVICE CAPABLE OF DISPLAYING IMAGE DATA APPROXIMATED TO ORIGINAL IMAGE DATA, ELECTROPHORETIC DISPLAY DEVICE, AND ELECTRONIC APPARATUS

BACKGROUND

1. Technical Field

An embodiment of the present invention relates to a method of driving an electrophoretic display device, an electrophoretic display device, and an electronic apparatus.

2. Related Art

In recent years, an electrophoretic display device is known in which an electrophoretic dispersion liquid contains inorganic particles and resin particles, which are colored in a color different from the color of the inorganic particles and have a charging polarity opposite to the charging polarity of the inorganic particles (for example, see JP-A-2007-148441), as electrophoretic particles. In this electrophoretic display device, it is possible to prevent the aggregation of the electrophoretic particles, realizing excellent display performance.

In general, in driving a desired pixel of an electrophoretic display device, an electric field which is applied to the electrophoretic particles tends to spread obliquely. For this reason, the electrophoretic particles of adjacent pixels are electrophoresed because of the oblique electric field, and are then displayed as a blot (blur) outside the desired pixel.

When the pixels of the electrophoretic display device are driven by a two-value driving method using two values of on and off, a plurality of gradation levels can be displayed through dithering. However, for example, when white particles and black particles are electrophoresed (driven) to display image data having a plurality of gradation levels, if image data of black (or including black in an equal or greater predetermined ratio) is displayed after image data of white (or including white in an equal or greater predetermined ratio) is displayed, the above-described blotting and dithering cancel each other, such that the gradation level which is lower (more blackened or darkened) than the gradation level of original image data. Similarly, if image data of white (or including white in an equal or greater predetermined ratio) is displayed after image data of black (or including black in an equal or greater predetermined ratio) is displayed, the above-described blotting and dithering cancel each other, such that the gradation level which is higher (more whitened or brightened) than the gradation level of original image data is formed.

SUMMARY

An advantage of some aspects of the invention is that it provides a method of driving an electrophoretic display device capable of displaying image data approximated to original image data, an electrophoretic display device, and an electronic apparatus.

An aspect of the invention provides a method of driving an electrophoretic display device which includes a display section having a plurality of pixels containing electrophoretic particles of a first color and electrophoretic particles of a second color. The method includes changing the gradation level of image data on the basis of correction data corresponding to the gradation level, converting image data with the changed gradation level to a dithering pattern, in which the first color and the second color are combined, corresponding to the changed gradation level for each predetermined region of image data, and driving the electrophoretic particles of the first color and the electrophoretic particles of the second color on the basis of image data converted to the dithering pattern for the plurality of pixels in the display section.

With this configuration, the gradation level of image data is changed on the basis of correction data corresponding to the gradation level and is converted to the dithering pattern corresponding to the changed gradation level for each predetermined region of image data. The electrophoretic particles of the first color and the electrophoretic particles of the second color are driven on the basis of the image data converted to the dithering pattern for a plurality of pixels in the display section. In the method of driving an electrophoretic display device of the related art, dithering is performed without taking into consideration blotting (blurring) in the display section, such that the first color or the second color is displayed densely (highlighted). Meanwhile, in the method of driving an electrophoretic display device of this aspect, the gradation level of image data is changed on the basis of correction data, dithering is performed with the changed gradation level, and the pixels of the display section are driven on the basis of image data after dithering. For this reason, the gradation level of original image data is changed taking into consideration the gamma characteristic of the display section that blotting (blurring) occurs in the pixels of the display section and dithering is performed, such that the first color or the second color is displayed densely (highlighted), making it possible to correct the gamma characteristic of the display section. Therefore, it is possible to display image data approximated to original image data on the display section, improving display quality of the electrophoretic display device.

Correction data may have a first correction value based on the first color and a second correction value based on the second color.

With this configuration, correction data which is used in changing the gradation level of image data has the first correction value based on the first color and the second correction value based on the second color. Here, the gamma characteristic of the display section after the first color, for example, white is displayed is different from the gamma characteristic of the display section after the second color, for example, black is displayed. Thus, for example, it is determined whether white is displayed (white display) or black is displayed (black display) on the basis of the gradation level of image date displayed on the display section at present, and in changing the gradation level of image data, the first correction value and the second correction value are used separately, making it possible to correct the gamma characteristic of the display section to a desired characteristic.

In the changing of the gradation level, one of the first correction value and the second correction value may be selected on the basis of luminance of image data displayed on the display section and used as correction data.

With this configuration, one of the first correction value and the second correction value is selected on the basis of the luminance of image data displayed on the display section, and the gradation level of image data is changed on the basis of the selected correction value. Thus, the first correction value and the second correction value can be used separately in accordance with the luminance of image data displayed on the display section at present, making it possible to correct the gamma characteristic of the display section to a desired characteristic.

The first correction value may be generated on the basis of reflectance when each of a plurality of gradation levels is displayed on the display section after the first color is displayed on the display section, and the second correction value may be generated on the basis of reflectance when each of a plurality of gradation levels is displayed on the display section after the second color is displayed on the display section.

With this configuration, the first correction value is generated on the basis of reflectance when each of a plurality of gradation levels is displayed after the first color is displayed on the display section, and the second correction value is generated on the basis of reflectance when each of a plurality of gradation levels is displayed on the display section after the second color is displayed on the display section. Thus, the first correction value and the second correction value are generated on the basis of reflectance of a gradation level actually displayed on the display section. Therefore, it is possible to generate the first correction value and the second correction value while reflecting the gamma characteristic of the display section that blot (blur) occurs in the pixels of the display section, and the first color or the second color is displayed densely (highlighted) because of dithering.

The method may further include, prior to the changing of the gradation level, causing one of the first color and the second color in all of the pixels of the display section.

With this configuration, prior to the changing of the gradation level, one of the first color and the second color is displayed in all of the pixels of the display section. Thus, a color which is displayed on the display section before image data is displayed is specified to one of the first color and the second color. Therefore, it is possible to easily determine whether the gamma characteristic to be corrected is the gamma characteristic of the display section after the first color is displayed or the gamma characteristic of the display section after the second color is displayed.

Another aspect of the invention provides an electrophoretic display device. The electrophoretic display device includes a display section which has a plurality of pixels containing electrophoretic particles of a first color and electrophoretic particles of a second color, a gradation level changing section which changes the gradation level of image data on the basis of correction data corresponding to the gradation level, a dithering section which converts image data with the changed gradation level to a dithering pattern, in which the first color and the second color are combined, corresponding to the changed gradation level for each predetermined region of image data, and a display section driving section which drives the electrophoretic particles of the first color and the electrophoretic particles of the second color on the basis of image data converted to the dithering pattern for the plurality of pixels in the display section.

With this configuration, the gradation level of image data is changed on the basis of correction data corresponding to the gradation level and is converted to the dithering pattern corresponding to the changed gradation level for each predetermined range of image data. The electrophoretic particles of the first color and the electrophoretic particles of the second color are driven on the basis of image data converted to the dithering pattern for a plurality of pixels in the display section. Here, in the electrophoretic display device of the related art, dithering is performed without taking into consideration blotting (blurring) of the display section, and the first color or the second color is displayed densely (highlighted). Meanwhile, in the electrophoretic display device of this aspect, the gradation level of image data is changed on the basis of correction data, dithering is performed with the changed gradation level, and the pixels of the display section are driven on the basis of image data after dithering. Thus, the gradation level of original image data is changed taking into consideration the gamma characteristic of the display section that blotting (blurring) occurs in the pixels of the display sections and the first color or the second color is displayed densely (highlighted) because of dithering, making it possible to correct the gamma characteristic of the display section. Therefore, it is possible to display image data approximated to original image data on the display section, improving display quality.

Still another aspect of the invention provides an electronic apparatus. The electronic apparatus includes the above-described electrophoretic display device.

With this configuration, the electronic apparatus includes the above-described electrophoretic display device. Thus, it is possible to realize various electronic apparatuses having excellent display quality.

BRIEF DESCRIPTION OF THE DRAWINGS

The invention will be described with reference to the accompanying drawings, wherein like numbers reference like elements.

FIG. 16 is a configuration diagram illustrating an example of a white display correction LUT.

FIG. 17 is a configuration diagram illustrating an example of a black display correction LUT.

DESCRIPTION OF EXEMPLARY EMBODIMENTS

Figure 1:
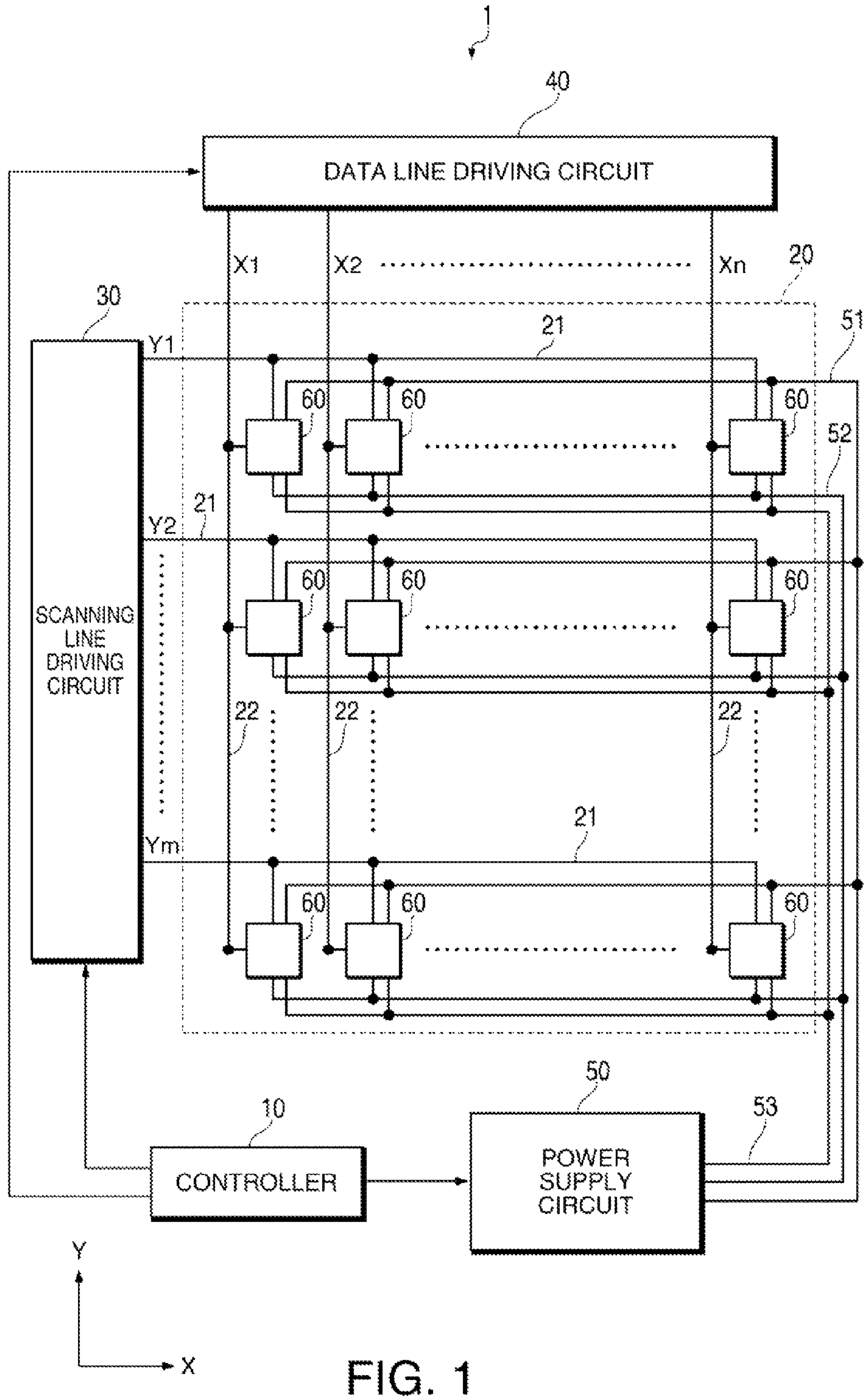
FIG. 1 is a schematic configuration diagram showing an example of an electrophoretic display device according to the invention.

Hereinafter, an embodiment of the invention will be described with reference to the drawings. In the drawings, the same or similar portions are represented by the same or similar reference numerals. However, the drawings are schematic. Thus, the specific dimension or the like can be determined with reference to the following description. Of course, the dimensional relationship or ratio differs between the drawings. In the drawings, the X axis and the Y axis are coordinate axes perpendicular to each other, and the Y axis is perpendicular to the horizontal direction with respect to the X axis. In the following description, the upper side of each drawing is referred to as "upper", the lower side is referred to "lower", the left side is referred to "left", and the right side is referred to as "right".

Method of driving electrophoretic display device and electrophoretic display device First Embodiment FIGS. 1 to 19 illustrate a first embodiment of a method of driving an electrophoretic display device and an electrophoretic display device according to the invention. FIG. 1 is a schematic configuration diagram showing an example of an electrophoretic display device according to the invention. As shown in FIG. 1, the electrophoretic display device 1 includes a controller 10, a display section 20, a scanning line driving circuit 30, a data line driving circuit 40, and a power supply circuit 50.

The controller 10 controls the operations of the scanning line driving circuit 30, the data line driving circuit 40, and the power supply circuit 50. The controller 10 includes an image signal processing circuit (not shown) or the like. The controller 10 generates various signals, for example, an image signal of an image to be displayed on the display section 20, a result signal for resetting in switching images, a timing signal, such as a clock signal or a start pulse, and the like, and outputs the signals to the scanning line driving circuit 30, the data line driving circuit 40, and the power supply circuit 50.

The display section 20 includes m scanning lines 21 (scanning lines Y1, Y2, . . . , and Ym) substantially arranged along the Y direction of the plane, n data lines 22 (data lines X1, X2, . . . , and Xn), and pixel circuits 60 arranged at intersections between the scanning lines 21 and the data lines 22.

The scanning line driving circuit 30 is connected to the scanning lines Y1, Y2, . . . , and Ym of the display section 20. The scanning line driving circuit 30 sequentially supplies scanning signals to the scanning lines Y1, Y2, . . . , and Ym in a pulsed manner on the basis of the timing signal input from the controller 10.

The data line driving circuit 40 is connected to the data lines X1, X2, . . . , and Xn of the display section 20. The data line driving circuit 40 supplies the image signals to the data lines X1, X2, . . . , and Xn on the basis of the timing signal input from the controller 10. The image signals have a binary level of a high potential level (hereinafter, referred to as high level) of, for example, 5 V and a low potential level (hereinafter, referred to as low level) of, for example, 0 V.

In this embodiment, the scanning line driving circuit 30 and the data line driving circuit 40 correspond to a "display section driving section" of the electrophoretic display device according to the invention.

The power supply circuit 50 is connected to a high-potential power line 51, a low-potential power line 52, and a common potential line 53. The power supply circuit 50 supplies a predetermined high-potential power potential Vdd of a high potential VH (for example, 12 to 15 V) to the high-potential power line 51, supplies a predetermined low-potential power potential Vss of a low potential VL (for example, 0 V) to the low-potential power line 52, and supplies a common potential Vcom to the common potential line 53.

Figure 2:
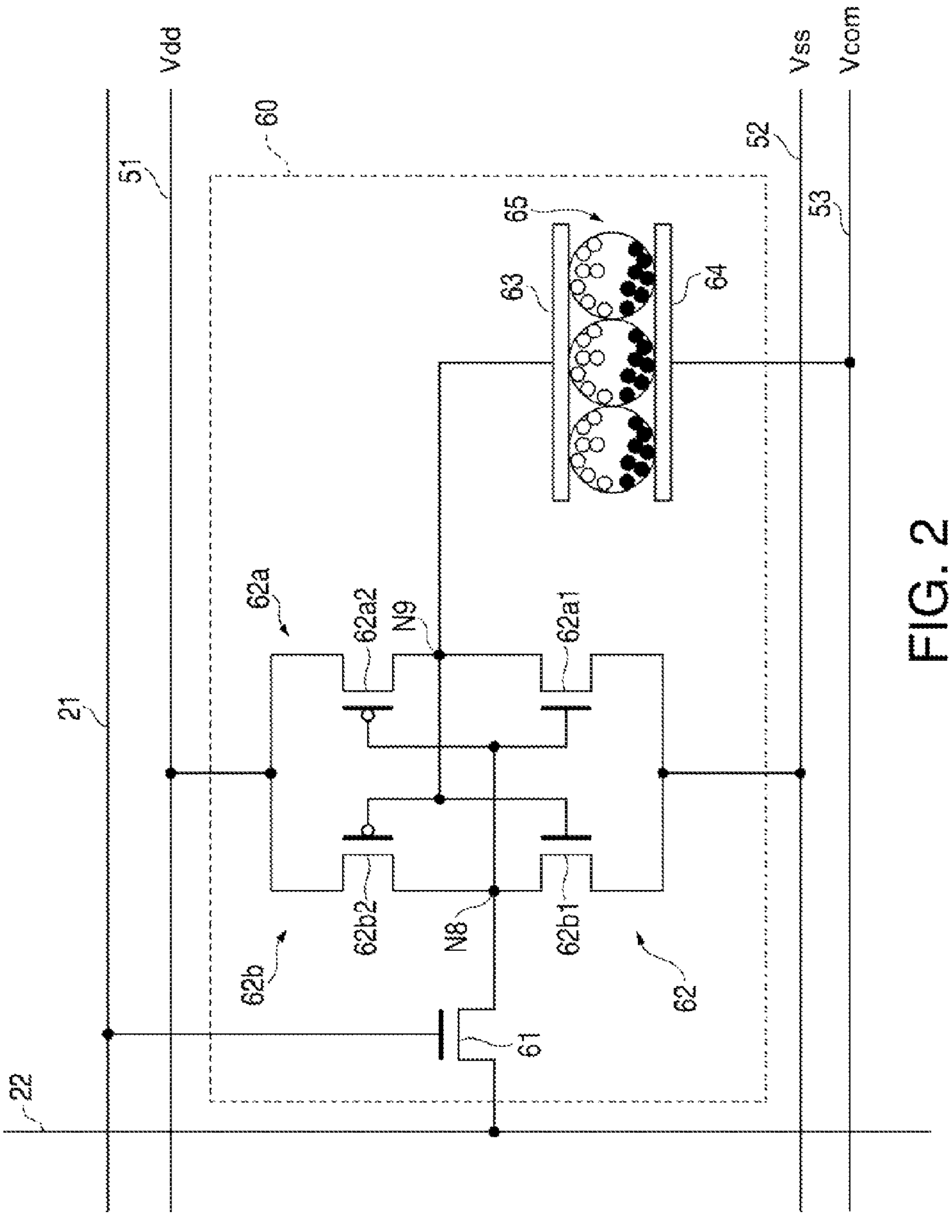
FIG. 2 is a circuit diagram illustrating the configuration of each pixel circuit shown in FIG. 1.

FIG. 2 is a circuit diagram illustrating the configuration of each pixel circuit shown in FIG. 1. As shown in FIG. 2, each pixel circuit 60 includes a switching transistor 61, a memory circuit 62, a pixel electrode 63, a common electrode 64, and an electrophoretic element 65.

The switching transistor 61 is constituted by an N-type transistor. The switching transistor 61 has a gate connected to the corresponding scanning line 21, a source connected to the corresponding data line 22, and a drain connected to an input terminal N8 of the memory circuit 62. The switching transistor 61 outputs the image signal, which is supplied from the data line driving circuit 40 through the data line 22, to the input terminal N8 of the memory circuit 62 at a timing according to the scanning signal which is supplied from the scanning line driving circuit 30 through the scanning line 21. The memory circuit 62 has inverter circuits 62*a* and 62*b*, and is constituted as an SRAM (Static Random Access Memory).

The inverter circuits 62*a* and 62*b* have a loop structure in which the output terminal of another inverter is connected to the input terminal of one inverter. That is, the input terminal of the inverter circuit 62*a* is connected to the output terminal of the inverter circuit 62*b*, and the input terminal of the inverter circuit 62*b* is connected to the output terminal of the inverter circuit 62*a*. The input terminal of the inverter circuit 62*a* is constituted as the input terminal N8 of the memory circuit 62, and the output terminal of the inverter circuit 62*a* is constituted as an output terminal N9 of the memory circuit 62.

The inverter circuit 62*a* includes an N-type transistor 62*a*1 and a P-type transistor 62*a*2. The gate of each of the N-type transistor 62*a*1 and the P-type transistor 62*a*2 is connected to the input terminal N8 of the memory circuit 62. The source of the N-type transistor 62*a*1 is connected to the low-potential power line 52, and the source of the P-type transistor 62*a*2 is connected to the high-potential power line 51. The drain of each of the N-type transistor 62*a*1 and the P-type transistor 62*a*2 is connected to the output terminal N9 of the memory circuit 62.

The inverter circuit 62*b* includes an N-type transistor 62*b*1 and a P-type transistor 62*b*2. The gate of each of the N-type transistor 62*b*1 and the P-type transistor 62*b*2 is connected to the output terminal N9 of the memory circuit 62. The source of the N-type transistor 62*b*1 is connected to the low-potential power line 52, and the source of the P-type transistor 62*b*2 is connected to the high-potential power line 51. The drain of each of the N-type transistor 62*b*1 and the P-type transistor 62*b*2 is connected to the input terminal N8 of the memory circuit 62.

In the memory circuit 62 configured as above, if an image signal at high level is input to the input terminal N8, the low potential VL is output from the output terminal N9, and if an image signal at low level is input to the input terminal N8, the high potential VH is output from the output terminal N9.

The pixel electrode 63 is connected to the output terminal N8 of the memory circuit 62. That is, the high potential VH or the low potential VL is supplied from the memory circuit 62 to the pixel electrode 63 in accordance with the image signal input to the memory circuit 62. The pixel electrode 63 is arranged to face a common electrode 64 through the electrophoretic element 65.

The common electrode 64 is connected to the common potential line 53, and is supplied with the common potential Vcom.

The electrophoretic element 65 is arranged between the pixel electrode 63 and the common electrode 64, and is constituted by a plurality of microcapsules.

Figure 3:
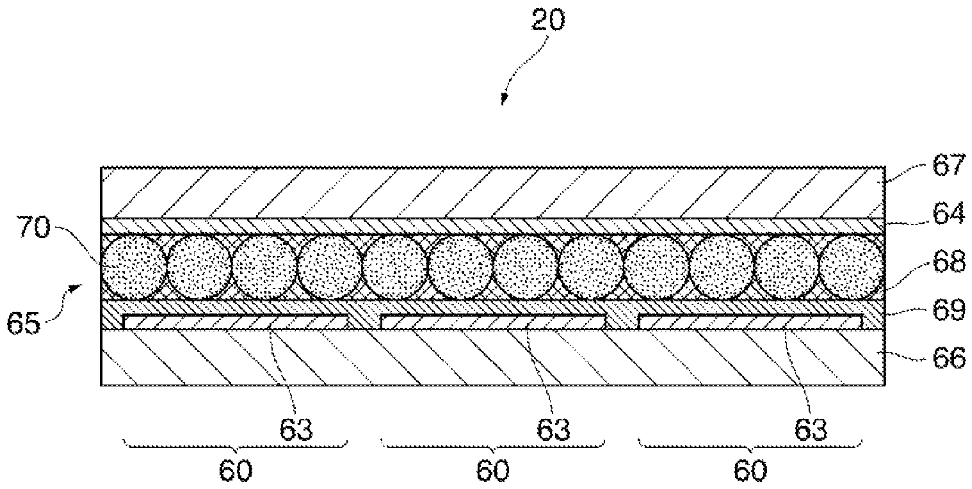
FIG. 3 is a partial sectional view of a display section shown in FIG. 1.

FIG. 3 is a partial sectional view of the display section shown in FIG. 1. As shown in FIG. 3, the display section 20 is configured such that the electrophoretic element 65 is sandwiched between an element substrate 66 and a counter substrate 67.

The element substrate 66 is a substrate which is made of glass or resin. Though not shown in FIG. 9, a laminate structure including the switching transistors 61, the memory circuits 62, the scanning lines 21, the data lines 22, the high-potential power line 51, the low-potential power line 52, the common potential line 53, and the like is formed on the element substrate 66. A plurality of pixel electrodes 63 are provided in a matrix above the laminate structure.

The counter substrate 67 is a transmissive substrate which is made of glass or resin. On the surface of the counter substrate 67 facing the element substrate 66, the common electrode 64 is formed in a solid shape to face a plurality of pixel electrodes 63. The common electrode 64 is formed of, for example, a light-transmissive conductive material, such as magnesium-silver (MgAg), indium-tin oxide (ITO), or indium-zinc oxide (IZO).

The electrophoretic element 65 is constituted by a plurality of microcapsules 70 containing electrophoretic particles, and is fixed between the element substrate 66 and the counter substrate 67 by a binder 68 and an adhesive layer 69 made of, for example, resin or the like. The electrophoretic display device 1 of this embodiment is manufactured by bonding an electrophoretic sheet, in which the electrophoretic element 65 is fixed to the counter substrate 67 by the binder 68 in advance, to the element substrate 66, on which the pixel electrodes 63 and the like are formed, by the adhesive layer 69.

The microcapsules 70 are sandwiched between the pixel electrodes 63 and the common electrode 64. One or a plurality of microcapsules 70 are arranged in each pixel circuit 60, that is, for each pixel electrode 63.

Figure 4:
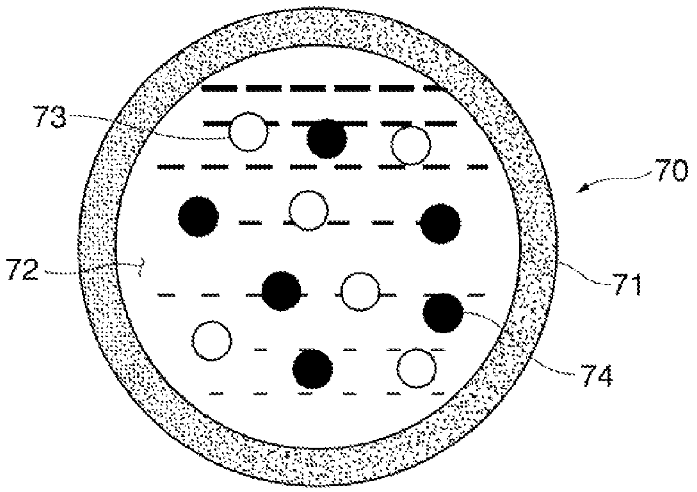
FIG. 4 is a schematic sectional view of a microcapsule shown in FIG. 3.

FIG. 4 is a schematic sectional view of each microcapsule shown in FIG. 3. As shown in FIG. 4, in each microcapsule 70, a dispersion medium 72, a plurality of white particles 73, and a plurality of black particles 74 are sealed in a film 71. Each microcapsule 70 is formed, for example, in a spherical shape having a particle size of about 50 micrometers.

The film 71 functions as a shell of each microcapsule and is formed of acrylic resin, such as polymethylmethacrylate or polyethylmethacrylate, or light-transmissive polymer resin, such as urea resin or gum arabic.

The dispersion medium 72 is a medium which disperses the white particles 73 and the black particles 74 into each microcapsule 70, that is, into the film 71. Examples of the dispersion medium 72 include water, an alcohol-based solvent, such as methanol, ethanol, isopropanol, butanol, octanol, or methyl cellosolve, a variety of esters, such as acetic ethyl or acetic butyl, ketones, such as acetone, methylethylketone, or methylisobutylketone, aliphatic hydrocarbon, such as pentane, hexane, or octane, cycloaliphatic hydrocarbon, such as cyclohexane or methylcyclohexane, aromatic hydrocarbon, such as benzene, toluene, or benzene having a long-chain alkyl group, such as xylene, hexylbenzene, hebuthylbenzene, octylbenzene, nonylbenzene, decylbenzene, undecylbenzene, dodecylbenzene, tridecylebenzene, or tetradecylbenzene, halogenated hydrocarbon, such as methylene chloride, chloroform, carbon tetrachloride, or 1,2-dichloroethane, carboxylate or other kinds of oils. The above-described materials may be used as a single material or a mixture, and a surfactant or the like may be mixed further thereto.

The white particles 73 are particles, polymer particles, or colloids made of white pigment, such as titanium dioxide, zinc flower, or antimony trioxide and are, for example, negatively charged.

The black particles 74 are particles, polymer particles, or colloids made of black pigment, such as aniline black or carbon black and are, for example, positively charged. Thus, the white particles 73 and the black particles 74 can be moved in the dispersion medium 72 by an electric field generated between the pixel electrode 63 and the common electrode 64.

A charge control agent containing particles of an electrolyte, a surfactant, metal soap, a resin, rubber, oil, varnish, compound, or the like, a dispersant, such as a titanium-coupling agent, an aluminum-coupling agent, or a silane-coupling agent, a lubricant, a stabilizing agent, or the like may be added to the above-described pigment, if necessary.

Figure 5A:
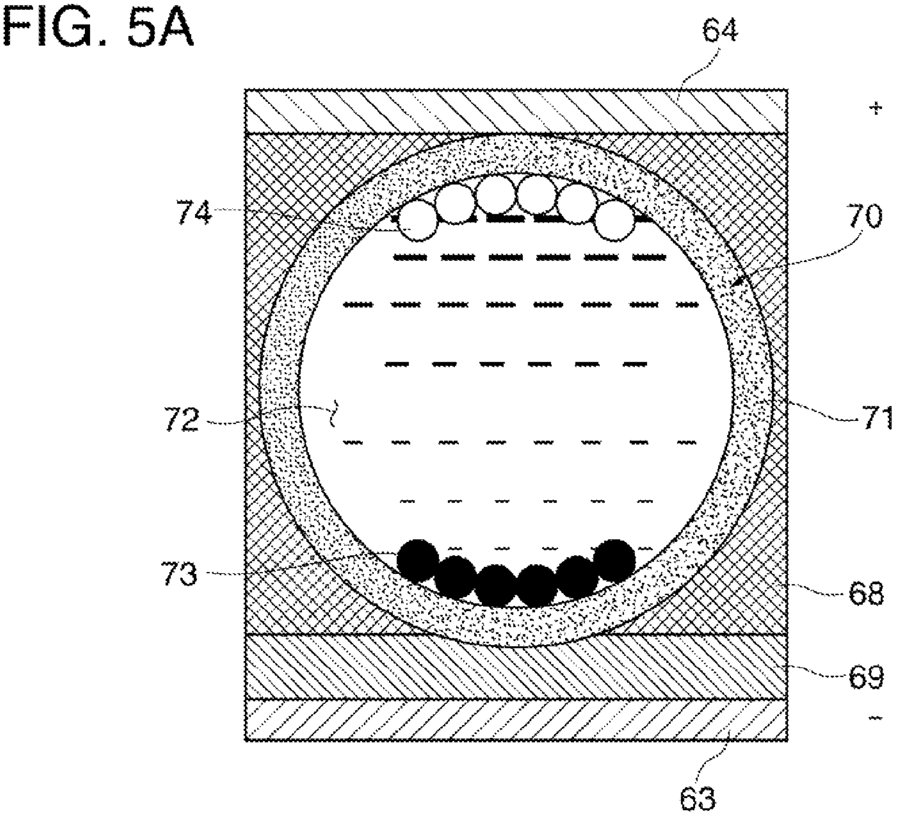
FIGS. 5A and 5B are schematic views illustrating the operation of a microcapsule shown in FIGS. 3 and 4.
Figure 5B:
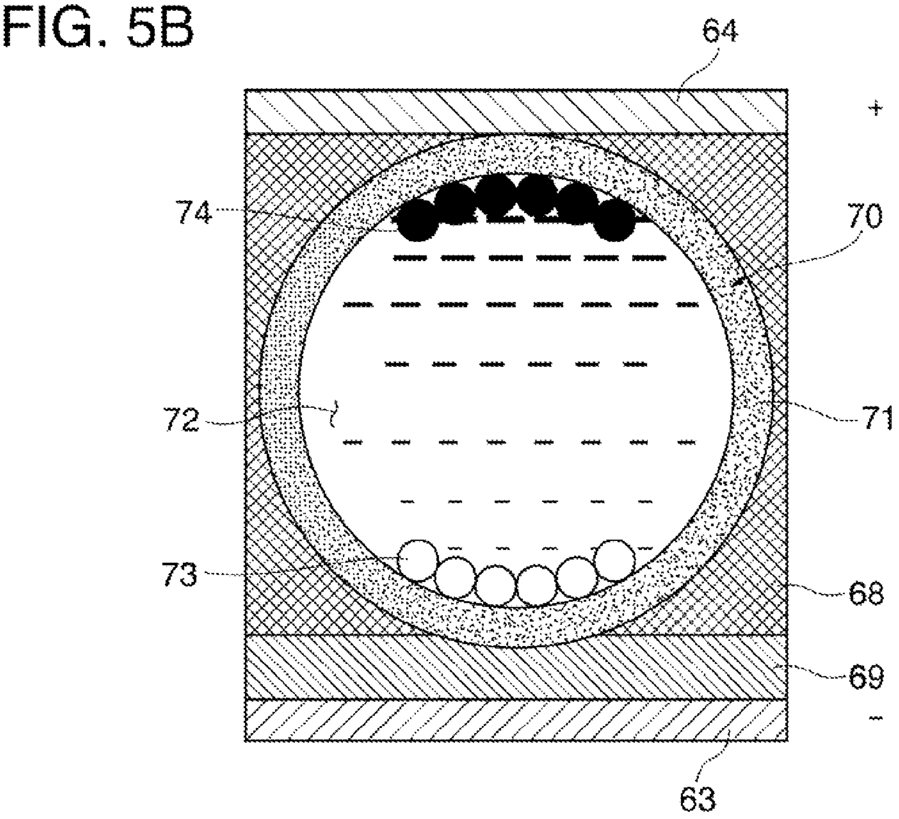

FIGS. 5A and 5B are schematic views illustrating the operation of each microcapsule shown in FIGS. 3 and 4. As shown in FIG. 5A, when a voltage is applied between the pixel electrode 63 and the common electrode 64 such that the potential of the common electrode 64 becomes relatively higher, the positively charged black particles 74 are pulled toward the pixel electrode 63 in the microcapsule 70 because of coulomb force, and the negatively charged white particles 73 are pulled toward the common electrode 64 in the microcapsule 70 because of coulomb force. Thus, the white particles 73 are collected on the common electrode 66 side in the microcapsule 70, that is, on the display surface side, and white is displayed on the display surface of the display section 20.

To the contrary, as shown in FIG. 5B, when a voltage is applied between the pixel electrode 63 and the common electrode 64 such that the potential of the pixel electrode 63 becomes relatively higher, the negatively charged white particles 73 are pulled toward the pixel electrode 63 in the microcapsule 70 because of coulomb force, and the positively charged black particles 74 are pulled toward the common electrode 64 in the microcapsule 70 because of coulomb force. Thus, the black particles 74 are collected on the display surface side in the microcapsule 70, and black is displayed on the display surface of the display section 20.

The pigment which is used for the white particles 73 and the black particles 74 is substituted with, for example, pigment of red, green, blue, or the like, making it possible to display red, green, blue, or the like.

Next, the problem that the invention is to solve will be described in detail with reference to FIGS. 6 to 12.

Figure 6:
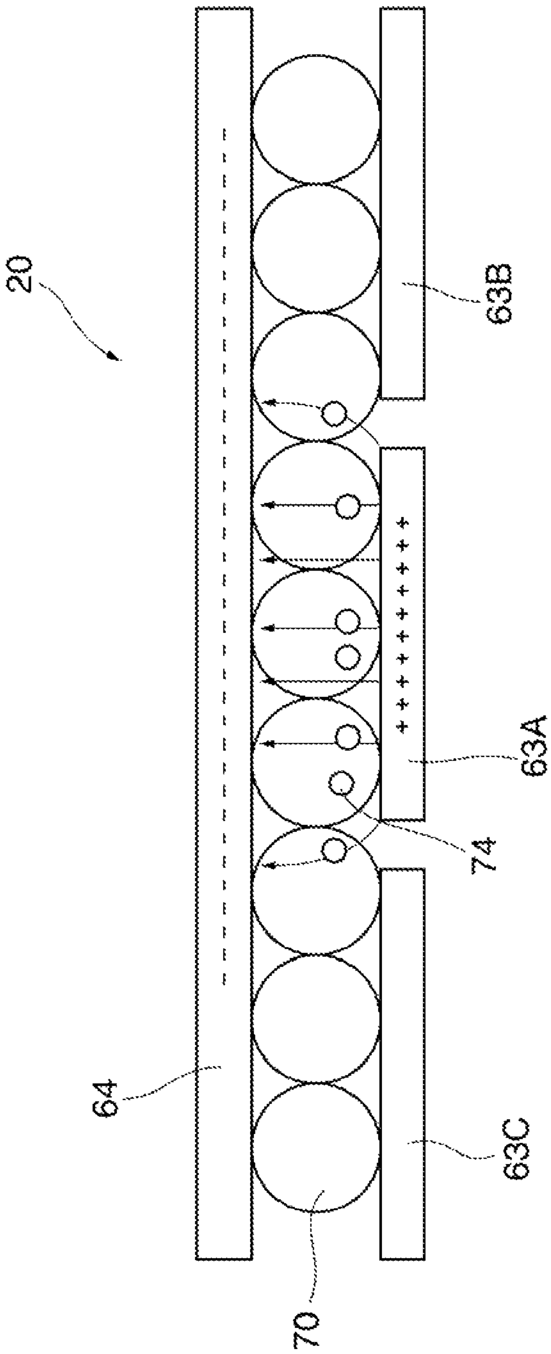
FIG. 6 is a schematic view illustrating the reason for blotting in a display section shown in FIG. 1.

FIG. 6 is a schematic view illustrating the reason for blotting in the display section shown in FIG. 1. In FIG. 6, for simplification of description, a part of the configuration is omitted. As shown in FIG. 5B, when black is displayed on the display surface of the display section 20, as shown in FIG. 6, a voltage is applied such that the potential of a pixel electrode 63A corresponding to a desired pixel becomes high, and the potential of the common electrode 64 becomes lower. However, since an electric field indicated by an arrow in FIG. 6 tends to obliquely spread, an electric field is applied to the microcapsules 70 between pixel electrodes 63B and 63C adjacent to the pixel electrode 63A and the common electrode 64, as well as the microcapsules 70 between the pixel electrode 63A and the common electrode 64. As a result, in the microcapsules 70 between the pixel electrodes 63B and 63C and the common electrode 64, some of the positively charged black particles 74 are moved toward the display surface (electrophoresed), and black is displayed in apart of adjacent pixels as well as a desired pixel. Accordingly, black of the display section 20 is viewed blotted (blurred). Similarly, as shown in FIG. 5A, when white is displayed on the display surface of the display section 20, white of the display section 20 is viewed blotted (blurred).

When so-called two-value driving is carried out in which the data line driving circuit 40 drives each pixel circuit 60 at binary level of low level and high level, the controller 10 performs dithering for converting image data to a dithering pattern with black and white combined for each predetermined region (hereinafter, referred to as a block). The dithering pattern is prepared for each of a plurality of gradation levels included in image data. For example, when image data has 256 gradation levels, 256 dithering patterns are prepared in total to correspond to the gradation levels. The controller 10 performs dithering on image data, such that the display section 20 which has displayed only two gradation levels of black and white can display an intermediate gradation level of gray or the like, and can thus display image data having a plurality of, for example, three or more, gradation levels in a pseudo manner.

Figure 7A:
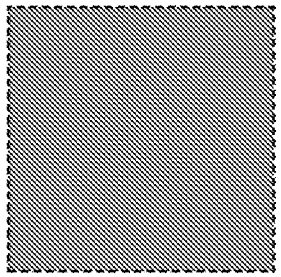
FIGS. 7A to 7C are conceptual diagrams illustrating blotting in dithering.
Figure 7B:
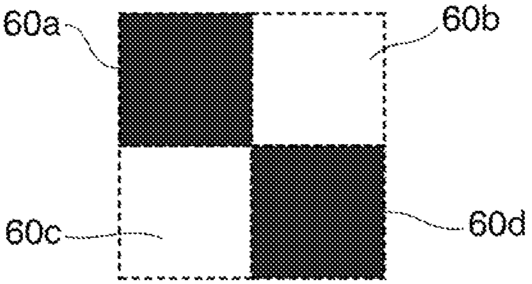
Figure 7C:
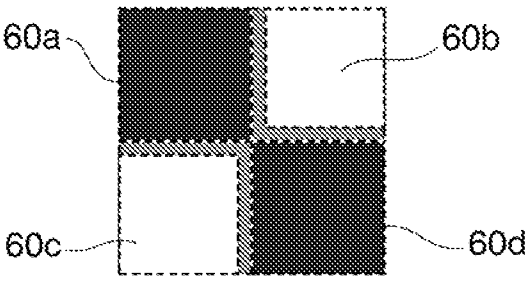

FIGS. 7A to 7C are conceptual diagrams illustrating blotting in dithering. In the dithering, as shown in FIG. 7A, with regard to a gradation level (in FIG. 7A, gray) between black and white, as shown in FIG. 7B, conversion is made to a dithering pattern corresponding to the gradation level. In the example shown in FIG. 7B, four pixels circuits 60*a*, 60*b*, 60*c*, and 60*d* constitute a single block, the pixel circuits 60*a* and 60*d* display "black", and the pixel circuits 60*b* and 60*c* display "white". However, when another color is displayed after one color is displayed, in each of the pixel circuits 60*a*, 60*b*, 60*c*, and 60*d* of the display section 20, another color is more highlighted because of blotting (blurring). That is, for example, if the pixel circuits 60*a*, 60*b*, 60*c*, and 60*d* are driven such that the dithering pattern shown in FIG. 7B is displayed after all the four pixel circuits 60*a*, 60*b*, 60*c*, and 60*d* display "white", as shown in FIG. 7C, black blotting occurs in the pixel circuits 60*b* and 60*c* adjacent to the pixel circuits 60*a* and 60*b*. As a result, an actual gradation level is viewed at a blackened (dense) gradation level compared to a gradation level by the dithering pattern of the related art. To the contrary, if the pixel circuits 60*a*, 60*b*, 60*c*, and 60*d* are driven such that the dithering pattern shown in FIG. 7B is displayed after all the four pixel circuits 60*a*, 60*b*, 60*c*, and 60*d* display "black", white blotting occurs in the pixel circuits 60*a* and 60*d* adjacent to the pixel circuits 60*b* and 60*c*. As a result, an actual gradation level is viewed whitened (dense) compared to a gradation level by the dithering pattern of the related art.

Figure 8:
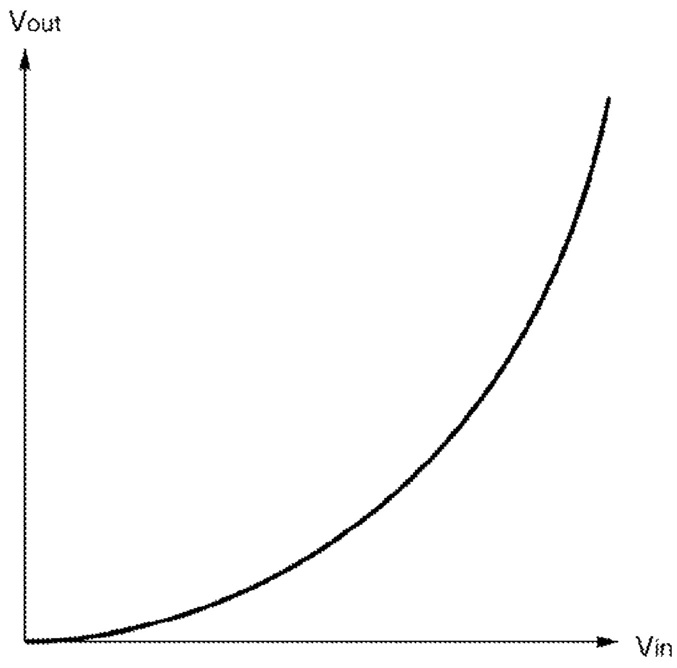
FIG. 8 is a graph illustrating a gamma characteristic after white display is performed on a display section in an electrophoretic display device of the related art.
Figure 9:
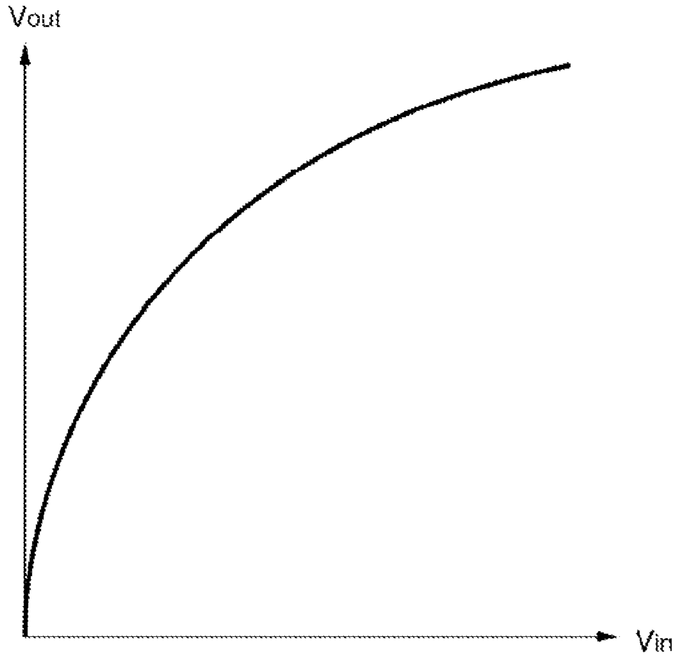
FIG. 9 is a graph illustrating a gamma characteristic after black display is performed on a display section in an electrophoretic display device of the related art.

FIG. 8 is a graph illustrating a gamma characteristic after white display is performed on the display section in the electrophoretic display device of the related art. FIG. 9 is a graph illustrating a gamma characteristic after black display is performed on the display section in the electrophoretic display device of the related art. In FIGS. 8 and 9, the horizontal axis represents an (original) gradation level $V_{in}$ of an input, and the vertical axis represents a gradation level $V_{out}$ of an output (display). It is configured such that, as the gradation level increases, lightness (brightness) increases and becomes close to white with black as the origin (zero). As shown in FIG. 8, in the electrophoretic display device of the related art, the gamma characteristic (gamma graph) after white is displayed over the entire display section (including a case where white is displayed in an equal or greater predetermined ratio. Hereinafter, these cases are collectively referred to as white display) shows that the brightness of an actual gradation level displayed on the display section is lower (blackened or darkened) than the gradation level of the input. Meanwhile, as shown in FIG. 9, the gamma characteristic (gamma graph) after black is displayed over the entire display section (including a case where black is displayed in an equal or greater predetermined ratio. Hereinafter, these cases are collectively referred to as black display) shows that the brightness of a gradation level of actual image data displayed on the display section is higher (whitened or brightened) than the brightness of original gradation level.

Figure 10:
FIG. 10 is a diagram illustrating an example of original image data.
Figure 11:
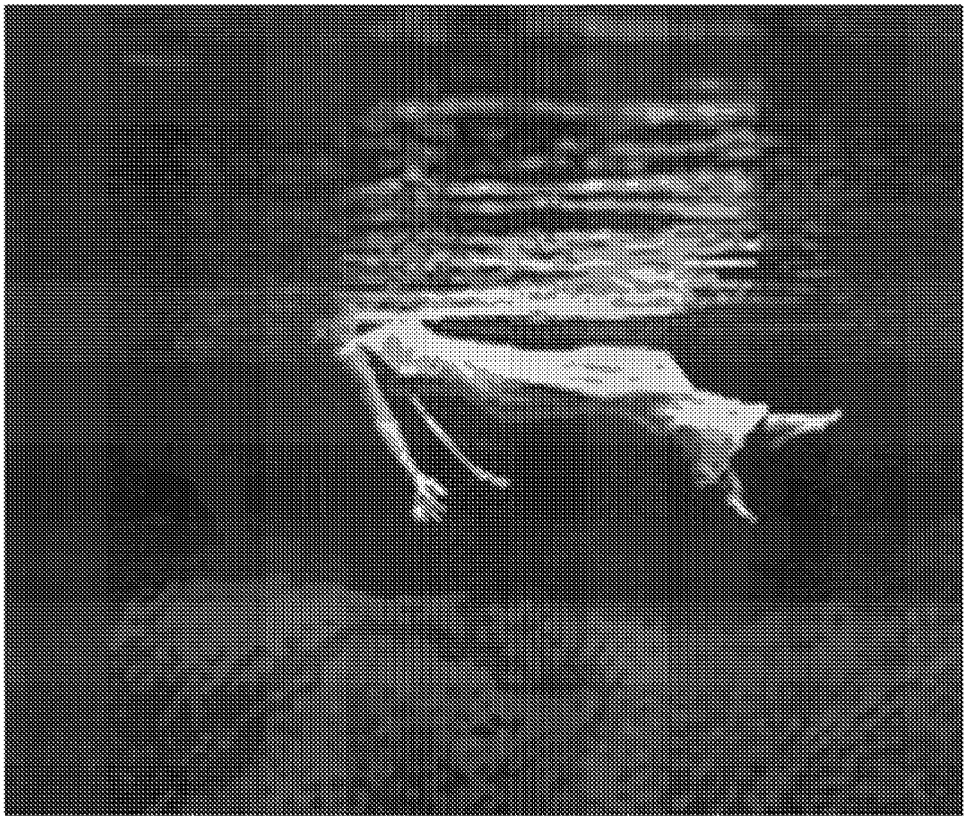
FIG. 11 is a diagram illustrating an example of image data after white display is performed on a display section in an electrophoretic display device of the related art.
Figure 12:
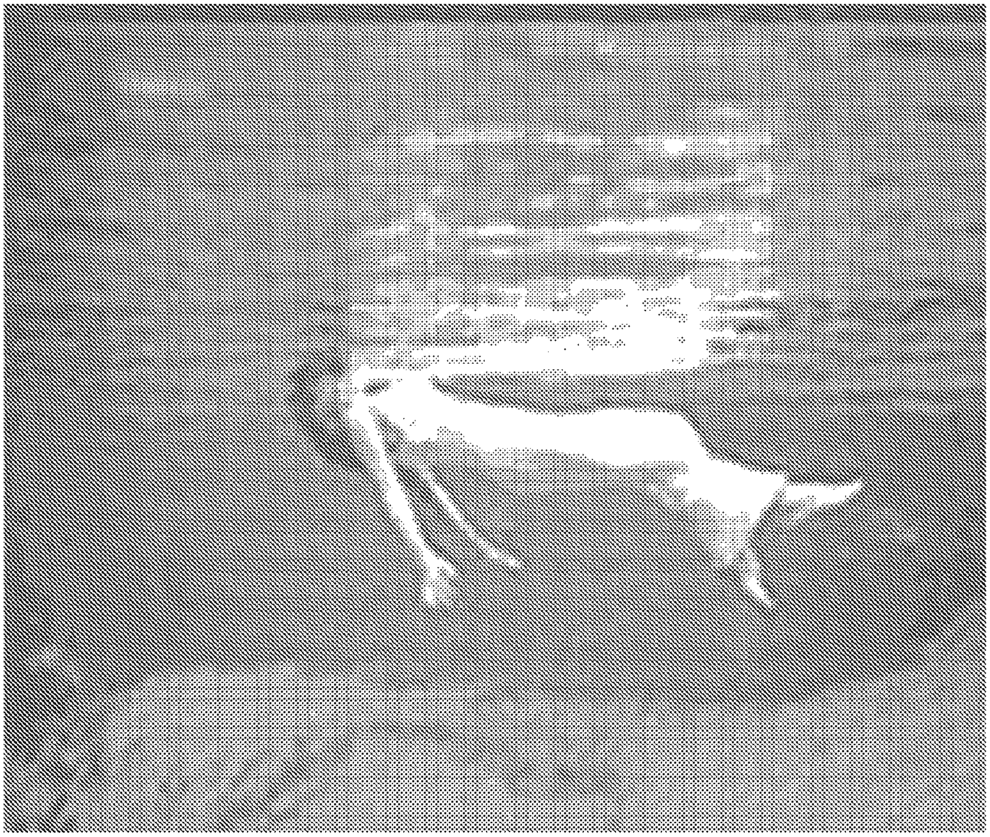
FIG. 12 is a diagram illustrating an example of image data after black display is performed on a display section in an electrophoretic display device of the related art.

FIG. 10 is a diagram illustrating an example of original image data. FIG. 11 is a diagram illustrating an example of image data after white display is performed on the display section in the electrophoretic display device of the related art. FIG. 12 is a diagram illustrating image data after black display is performed on the display section in the electrophoretic display device of the related art. Specifically, with respect to original image data shown in FIG. 10, image data after white display is performed on the display section becomes image data in which black is blotted (blurred) and black is thus highlighted as shown in FIG. 11. Meanwhile, as shown in FIG. 12, image data after black display is performed on the display section becomes image data in which white is blotted (blurred) and white is thus highlighted.

For example, if it is assumed that a power function model can be applied to the gamma characteristic after white display is performed on the display section, the gradation level $V_{out}$ of the output is expressed by the following expression (1).

$$V_{out}=V_{in}\hat{}\gamma_d \quad (1)$$

wherein "^" represents power.

Here, if the gradation level $V_{in}$ of the input is 100/255 and $\gamma_d=2$, the gradation level $V_{out}$ of the output is as follows from the expression (1).

$$V_{out}=(100/255)\hat{}2=0.153$$

That is, when the gradation level $V_{in}$ of the input is "100", the gradation level $V_{out}$ of the output becomes "39" (=0.153×255), and display is performed at a gradation level significantly lower than the original gradation level.

Next, an operation to display image data in the electrophoretic display device shown in FIG. 1 will be described with reference to FIGS. 13 to 19.

Figure 13:
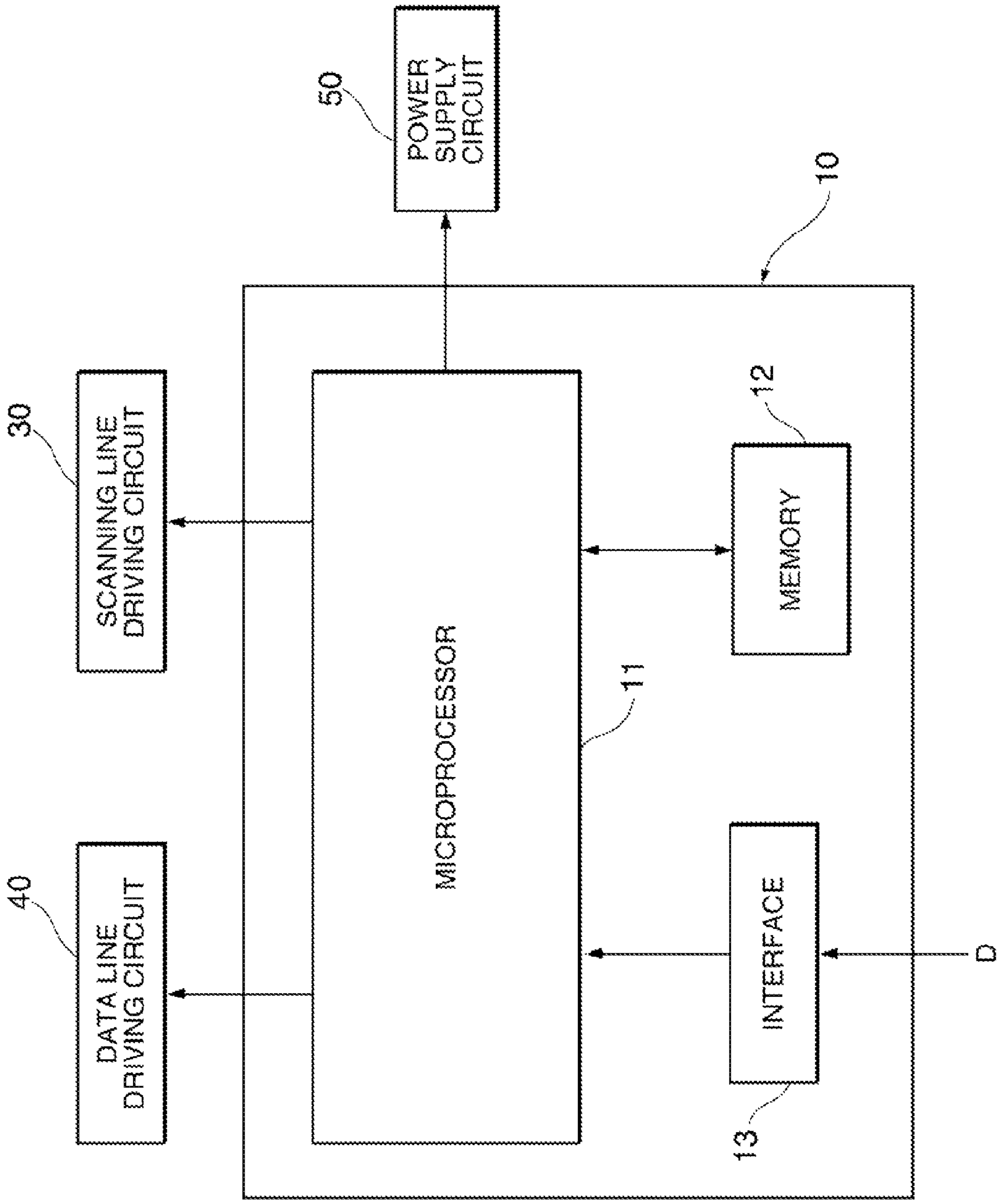
FIG. 13 is a block diagram illustrating the configuration of a controller shown in FIG. 1.

FIG. 13 is a block diagram illustrating the configuration of the controller shown in FIG. 1. As shown in FIG. 13, the controller 10 includes a microprocessor 11, a memory 12, and an interface 13.

The microprocessor 11 is, for example, a CPU (Central Processing Unit), and performs various kinds of processing described below on input image data to generate and output various signals described above.

The memory 12 is constituted by, for example, a RAM (Random Access Memory), a ROM (Read Only Memory), or the like, and stores image data or a lookup table (hereinafter, referred to as LUT) described below. Data which is stored in the memory 12 is written or read by the microprocessor 11.

The interface 13 is provided to input data transmitted from an external circuit (not shown) to the microprocessor 11. For example, image data D is input to the microprocessor 11 through the interface 13.

Figure 14:
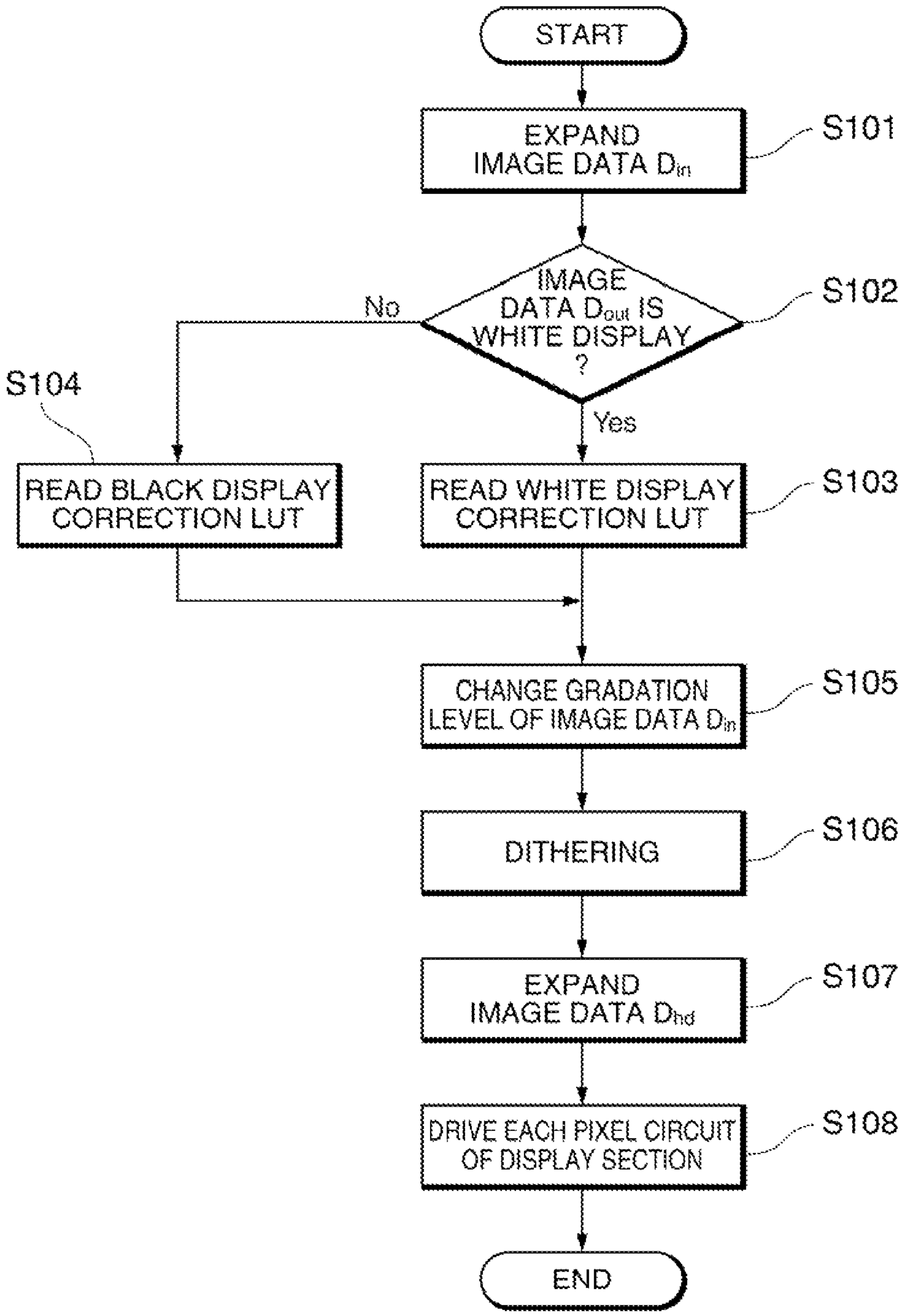
FIG. 14 is a flowchart illustrating an operation to display image data on a display section shown in FIG. 1.

FIG. 14 is a flowchart illustrating an operation to display image data on the display section shown in FIG. 1. If image data D which will be displayed on the display section 20 is input to the microprocessor 11 through the interface 13 shown in FIG. 13, as shown in FIG. 14, the microprocessor 11 expands input image data (hereinafter, denoted by $D_{in}$) to correspond to the arrangement (matrix) of the pixel circuits 60 in the display section 20 and writes expanded image data in the memory 12 (S101).

Next, the microprocessor 11 determines whether or not image data (hereinafter, denoted by $D_{out}$) displayed on the display section 20 at present is white display (S102). The determination on either white display or black display is made on the basis of, for example, the luminance of the display section 20. If the luminance is equal to or greater than a predetermined value, it is determined to be white display, and if the luminance is smaller than the predetermined value, it is determined to be not white display, that is, to be black display. Thus, a white display correction LUT 121 and a black display correction LUT 122 described below can be separately used in accordance with the luminance of image data $D_{out}$ displayed on the display section 20 at present.

Although in this embodiment, it is determined whether or not image data $D_{out}$is white display, the invention is not limited thereto. For example, it may be determined whether or not image data $D_{out}$ is black display.

When it is determined in S102 that image data $D_{out}$ displayed on the display section 20 is white display, the microprocessor 11 reads the white display correction LUT 121 described below from the memory 12 (S103). When it is determined in S102 that image data $D_{out}$ displayed on the display section 20 is black display, the microprocessor 11 reads the black display correction LUT 122 described below from the memory 12 (S104).

The gamma characteristic of the display section 20 after white is displayed is different from the gamma characteristic of the display section 20 after black is displayed. Thus, for example, it is determined whether white is displayed (white display) or black is displayed (black display) on the basis of the gradation level of image data $D_{out}$ displayed on the display section 20 at present, and in changing the gradation level of image data $D_{in}$, the white display correction LUT 121 and the black display correction LUT 122 are separately used, making it possible to correct the gamma characteristic of the display section 20 to a desired characteristic.

Figure 15A:
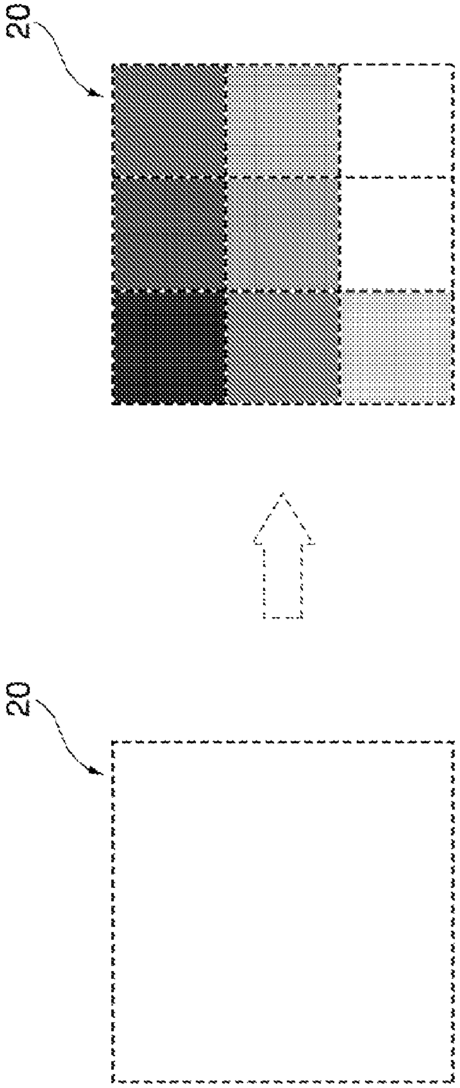
FIGS. 15A and 15B are diagrams illustrating a method of generating a white display correction LUT and a black display correction LUT.
Figure 15B:
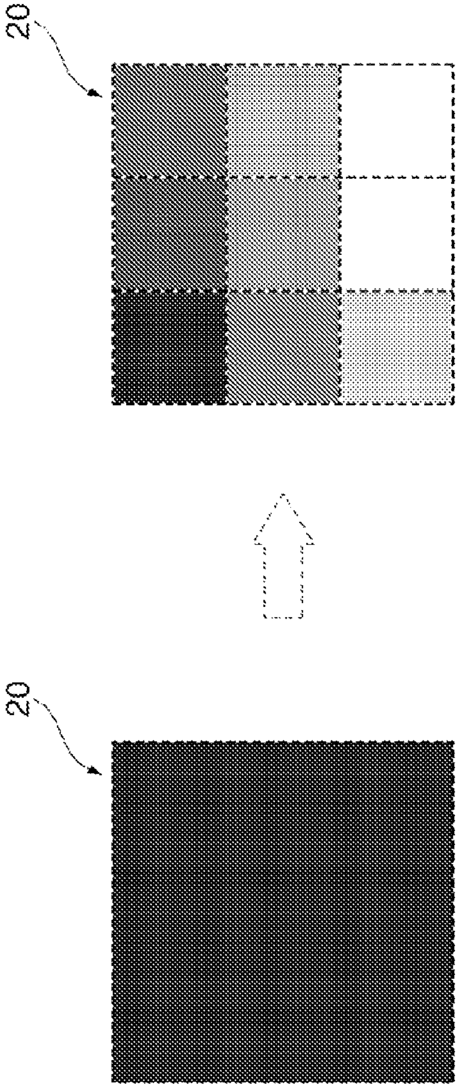

FIGS. 15A and 15B are diagrams illustrating a method of generating a white display correction LUT and a black display correction LUT. FIGS. 15A and 15B show a case where the display section 20 can display nine gradation levels. The white display correction LUT 121 and the black display correction LUT 122 which are stored in the memory 12 are generated, for example, by displaying all the gradation levels of the display section 20 and measuring reflectance of each gradation level to be displayed during a test process in manufacturing the electrophoretic display device 1. That is, as shown in FIG. 15A, after white is displayed over the entire display section 20 on the left side, all gradation levels which can be displayed are respectively displayed in the predetermined regions of the display section 20 on the right side. Then, in the display section 20 on the right side, reflectance [%] of the gradation level displayed in each predetermined region is measured. At this time, each gradation level is expressed by the above-described dithering, and the above-described black blotting occurs, such that the gamma characteristic of the display section 20 after white display is measured. Similarly, as shown in FIG. 15B, after black is displayed over the entire display section 20 on the left side, all gradation levels which can be displayed are respectively displayed in the predetermined regions of the display section 20 on the right side. Then, in the display section 20 on the right side, reflectance [%] of the gradation level displayed in each predetermined region is measured. At this time, each gradation level is expressed by the above-described dithering, and the above-described white blotting occurs, such that the gamma characteristic of the display section 20 after black display is measured.

Next, as reflectance as a reference, a sheet corresponding to each gradation level is prepared and reflectance of the sheet is measured. In comparison of reflectance when each gradation level is displayed on the display section 20 with reflectance as a reference, a correction value for correcting the gradation level is generated.

Specifically, for example, when the display section 20 can display 256 gradation levels of 0 to 255, if the gradation level is "100", actual reflectance when the display section 20 is actually measured is 45%. In this case, when reference reflectance is 60%, the gradation level $V_h$ after correction is computed as follows.

$$V_h=\text{Correction Value}\times\text{Gradation Level}=\{(\text{Actual Reflectance})/(\text{Reference Reflectance})\}\times(100/255)=\{(45/100)/(60/100)\}\times(100/255)=75/255$$

Here, the gradation level is normalized (standardized) to a value equal to or greater than 0 and equal to or smaller than 1.

FIG. 16 is a configuration diagram illustrating an example of the white display correction LUT. FIG. 17 is a configuration diagram illustrating an example of the black display correction LUT. As shown in FIG. 16, the white display correction LUT 121 includes a column 121*a* of gradation level and a column 121*b* of gradation level after correction. As shown in FIG. 17, the black display correction LUT 122 includes a column 122*a* of gradation level and a column 122*b* of gradation level after correction. One record (row) in the white display correction LUT 121 and the black display correction LUT 122 is registered for each gradation level which can be displayed by the display section 20. That is, when the display section 20 can display 256 gradations, 256 records are registered in each of the white display correction LUT 121 and the black display correction LUT 122.

The column 121*a* of gradation level and the column 122*a* of gradation level store information of the gradation levels, for example, the values of the gradation levels of "0" to "255". The column 121*b* of gradation level after correction and the column 122*b* of gradation level after correction store information of the gradation levels corrected by the correction value, for example, the numerical values of the gradation levels after correction normalized (standardized) to be equal to or greater than "0" and equal to or smaller than "1". Thus, the white display correction LUT 121 and the black display correction LUT 122 are generated on the basis of reflectance of the gradation levels actually displayed on the display section 20. As a result, it is possible to generate the white display correction LUT 121 and the black display correction LUT 122 while reflecting the gamma characteristic of the display section 20 that blotting (blurring) occurs in the pixels of the display section 20, and white or black is displayed densely (highlighted) due to dithering.

After S102 and S103 in FIG. 14, the microprocessor 11 changes the gradation level of input image data $D_{in}$ to information in the column 121*b* of gradation level after correction or the column 122*b* of gradation level after correction on the basis of the read white display correction LUT 121 or black display correction LUT 122 (S105).

Next, the microprocessor 11 performs dithering for converting each block of image data (hereinafter, denoted by $D_h$) after change to a dithering pattern (S106). In the dithering, there are a plurality of dithering methods (dithering algorithms), such as an average dithering method and a random dithering method, regardless of the types.

Next, the microprocessor 11 expands image data (hereinafter, denoted by $D_{hd}$) after dithering to correspond to the arrangement (matrix) of the pixel circuits 60 in the display section 20 and writes expanded image data in the memory 12 (S107). The microprocessor 11 sequentially outputs data after expansion written in the memory 12 to the data line driving circuit 40 as an image signal, and also outputs the timing signals to the scanning line driving circuit 30 and the data line driving circuit 40 to drive the pixel circuits 60 of the display section 20, such that image data $D_{hd}$ after dithering is displayed on the display section 20 (S108).

In the method of driving an electrophoretic display device of the related art, dithering is performed without taking into consideration blotting (blurring) in the display section, such that white or black is displayed densely (highlighted). Meanwhile, in the method of driving the electrophoretic display device 1 according to the embodiment of the invention, the gradation level of image data $D_{in}$ is changed on the basis of the correction value, and dithering is performed with the changed gradation level, such that the pixel circuits 60 of the display section 20 are driven on the basis of image data $D_{hd}$ after dithering. Therefore, the gradation level of original image data $D_{in}$ is changed taking into consideration the gamma characteristic of the display section 20 that blotting (blurring) occurs in the pixels of the display section 20, and white or black is displayed densely (highlighted), making it possible to correct the gamma characteristic of the display section.

Figure 18:
FIG. 18 is a diagram illustrating an example of image data after white display is performed on a display section in an electrophoretic display device shown in FIG. 1.
Figure 19:
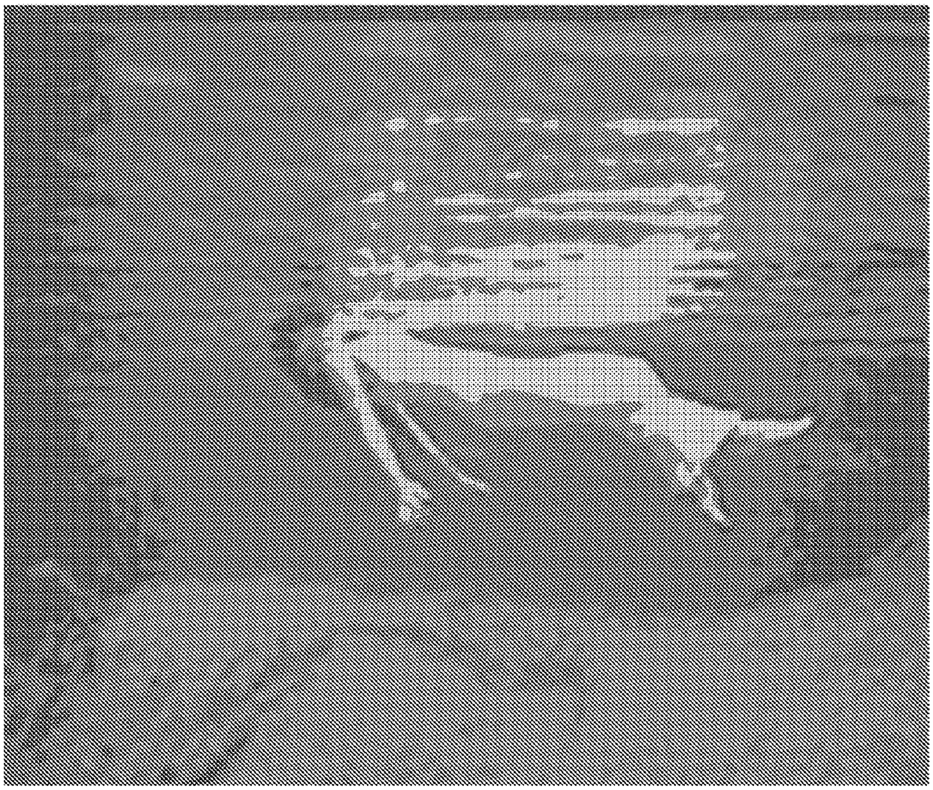
FIG. 19 is a diagram illustrating an example of image data after black display is performed on a display section in an electrophoretic display device shown in FIG. 1.

FIG. 18 is a diagram illustrating an example of image data after white display is performed on the display section in the electrophoretic display device shown in FIG. 1. FIG. 19 is a diagram illustrating an example of image data after black display is performed on the display section in the electrophoretic display device shown in FIG. 1. As shown in FIG. 18, for example, the gradation level is corrected by the white display correction LUT 121, and image data $D_{hd}$ which is displayed on the display section 20 is expressed such that black is suppressed (reduced), compared to image data shown in FIG. 11 displayed in the related art, and is more approximated to original (input) image data $D_{in}$ shown in FIG. 10. As shown in FIG. 19, for example, the gradation level is corrected by the black display correction LUT 122, and image data $D_{hd}$ which is displayed on the display section 20 is expressed such that white is suppressed (reduced), compared to image data shown in FIG. 12 displayed in the related at, and is more approximated to original (input) image data $D_{in}$ shown in FIG. 10.

Although in this embodiment, the microprocessor 11 of the controller 10 changes the gradation level of image data $D_{in}$ and performs dithering, the invention is not limited thereto. The scanning line driving circuit 30 and the data line driving circuit 40 may perform dithering. In this case, the white display correction LUT 121 and the black display correction LUT 122 which are stored in the memory 12 of the controller 10 may be stored in the internal memories of the scanning line driving circuit 30 and the data line driving circuit 40.

As described above, according to the method of driving the electrophoretic display device 1 of this embodiment, the gradation level of image data $D_{in}$ is changed on the basis of the correction value corresponding to the gradation level, and converts image data to a dithering pattern corresponding to the changed gradation level for each predetermined region of image data $D_h$, and for a plurality of pixel circuits 60 in the display section 20, the white particles 73 and the black particles 74 are driven on the basis of image data $D_{hd}$ converted to the dithering pattern. In the method of driving an electrophoretic display device of the related art, dithering is performed without taking into consideration blotting (blurring) of the display section, such that white or black is displayed densely (highlighted). Meanwhile, in the method of driving the electrophoretic display device 1 of this embodiment, the gradation level of image data $D_{in}$ is changed on the basis of the correction value, dithering is performed with the changed gradation level, and the pixel circuits 60 of the display section 20 are driven on the basis of image data $D_{hd}$ after dithering. Thus, the gradation level of original image data $D_{in}$ is changed taking into consideration the gamma characteristic of the display section 20 that blotting (blurring) occurs in the pixels of the display section 20, and white or black is displayed densely (highlighted) because of dithering, making it possible to correct the gamma characteristic of the display section. Therefore, it is possible to display image data $D_{hd}$ approximated to original image data $D_{in}$ on the display section 20, improving display quality of the electrophoretic display device 1.

According to the method of driving the electrophoretic display device 1 of this embodiment, the correction which is used in changing the gradation level of the image data $D_{in}$ has the white display correction LUT 121 based on white and the black display correction LUT 122 based on black. Here, the gamma characteristic of the display section 20 after white is displayed is different from the gamma characteristic of the display section 20 after black is displayed. Thus, for example, it is determined whether white is displayed (white display) or black is displayed (black display) on the basis of the gradation level of image data $D_{out}$ displayed on the display section 20 at present, and in changing the gradation level of image data $D_{in}$, the white display correction LUT 121 and the black display correction LUT 122 are separately used, making it possible to correct the gamma characteristic of the display section 20 to a desired characteristic.

According to the method of driving the electrophoretic display device 1 of this embodiment, one of the white display correction LUT 121 and the black display correction LUT 122 is selected on the basis of the luminance of image data $D_{out}$ displayed on the display section 20, and the gradation level of image data $D_{in}$ is changed on the basis of the selected correction value. Thus, the white display correction LUT 121 and the black display correction LUT 122 can be separately used in accordance with the luminance of image data $D_{out}$ displayed on the display section 20 at present, making it possible to correct the gamma characteristic of the display section 20 to a desired characteristic.

According to the method of driving the electrophoretic display device 1 of this embodiment, the white display correction LUT 121 is generated on the basis of reflectance when each of a plurality of gradation levels is displayed on the display section 20 after white is displayed on the display section 20, and the black display correction LUT 122 is generated on the basis of reflectance when each of a plurality of gradation levels is displayed after black is displayed on the display section 20. Thus, the white display correction LUT 121 and the black display correction LUT 122 are generated on the basis of reflectance of the gradation levels actually displayed on the display section 20. As a result, it is possible to generate the white display correction LUT 121 and the black display correction LUT 122 while reflecting the gamma characteristic of the display section 20 that blotting (blurring) occurs in the pixels of the display section 20, and white or black is displayed densely (highlighted).

As described above, according to the electrophoretic display device 1 of this embodiment, the gradation level of image data $D_{in}$ is changed on the basis of the correction value corresponding to the gradation level, image data is converted to a dithering pattern corresponding to the changed gradation level for each predetermined region of image data $D_h$, and for a plurality of pixel circuits 60 of the display section 20, the white particles 73 and the black particles 74 are driven on the basis of image data $D_{hd}$ converted to the dithering pattern. In the electrophoretic display device of the related art, dithering is performed without taking into consideration blotting (blurring) of the display section, such that white or black is displayed densely (highlighted). Meanwhile, in the electrophoretic display device 1 of this embodiment, the gradation level of image data $D_{in}$ is changed on the basis of the correction value, dithering is performed with the changed gradation level, and the pixel circuits 60 of the display section 20 are driven on the basis of image data $D_{hd}$ after dithering. Thus, the gradation level of original image data $D_{in}$ is changed taking into consideration the gamma characteristic of the display section 20 that blotting (blurring) occurs in the pixels of the display section 20, and white or black is displayed densely (highlighted) because of dithering, making it possible to correct the gamma characteristic of the display section. Therefore, it is possible to display image data $D_{hd}$ approximated to original image data $D_{in}$ on the display section 20, improving display quality.

Second Embodiment

Figure 20:
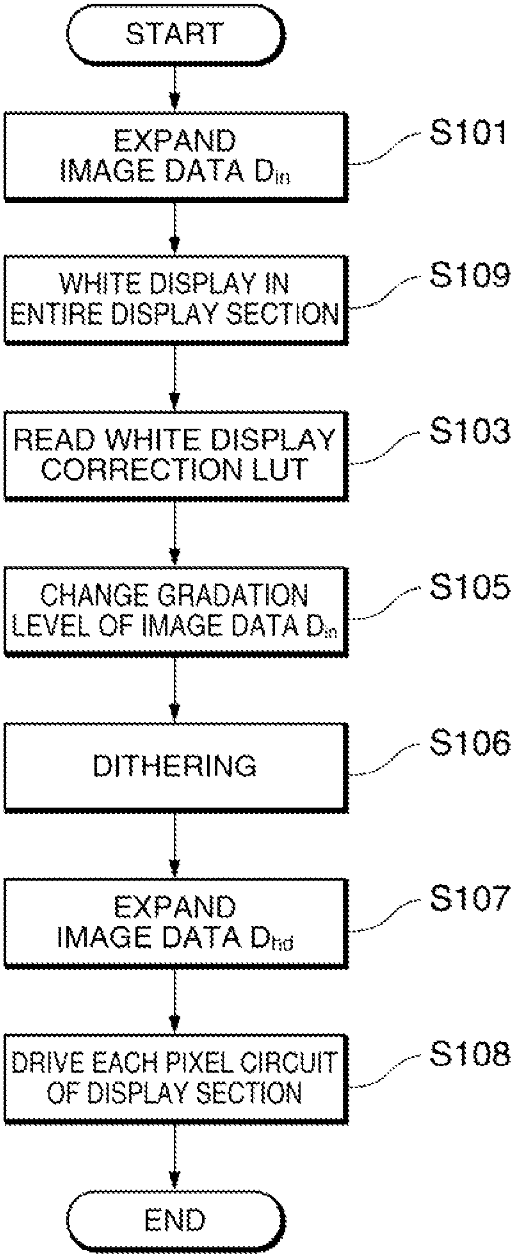
FIG. 20 is a flowchart illustrating an operation to display image data on a display section in a second embodiment.

FIG. 20 illustrates a second embodiment of a method of driving an electrophoretic display device and an electrophoretic display device according to the invention. The same parts as those in the first embodiment are represented by the same reference numerals, and description thereof will be omitted. The parts which are not shown are the same as those in the first embodiment.

The second embodiment is different from the first embodiment in that, instead of the determination in S102 of FIG. 14, either white or black is displayed over the entire display section 20.

FIG. 20 is a flowchart illustrating the operation to display image data on the display section in the second embodiment. As shown in FIG. 20, the microprocessor 11 shown in FIG. 13 expands image data $D_{in}$ input in S101 to correspond to the arrangement (matrix) of the pixel circuits 60 in the display section 20 of FIG. 1 and writes expanded image data in the memory 12. Then, the microprocessor 11 sequentially outputs image signals for white display to the data line driving circuit 40 and also sequentially outputs the timing signals to the scanning line driving circuit 30 and the data line driving circuit 40, such that white is displayed on the entire display section 20 (S109). Thus, the color which is displayed on the display section before image data $D_{in}$ is displayed is specified to white. Therefore, it is possible to easily determine that the gamma characteristic to be corrected is the gamma characteristic of the display section 20 after white display.

Next, as in the first embodiment, the microprocessor 11 carries out S103 and reads the white display correction LUT 121 from the memory 12.

Although in this embodiment, the microprocessor 11 displays white over the entire display section 20 in S109, the invention is not limited thereto. Black may be displayed over the entire display section 20. In this case, the microprocessor 11 subsequently carries out S104 shown in FIG. 14, instead of S103, and reads the black display correction LUT 122 from the memory 12.

As described above, according to the method of driving the electrophoretic display device 1 according to this embodiment, in S105, prior to changing the gradation level of image data $D_{in}$, either white or black is displayed over the entire display section 20. Thus, the color which is displayed on the display section 20 before image data $D_{in}$ is displayed is specified to one of white and black. Therefore, it is possible to easily determine whether the gamma characteristic to be corrected is the gamma characteristic of the display section 20 after white display or the gamma characteristic of the display section 20 after black display.

Electronic Apparatus

Next, an electronic apparatus according to an embodiment of the invention will be described with reference to FIGS. 21A to 23.

Figure 21A:
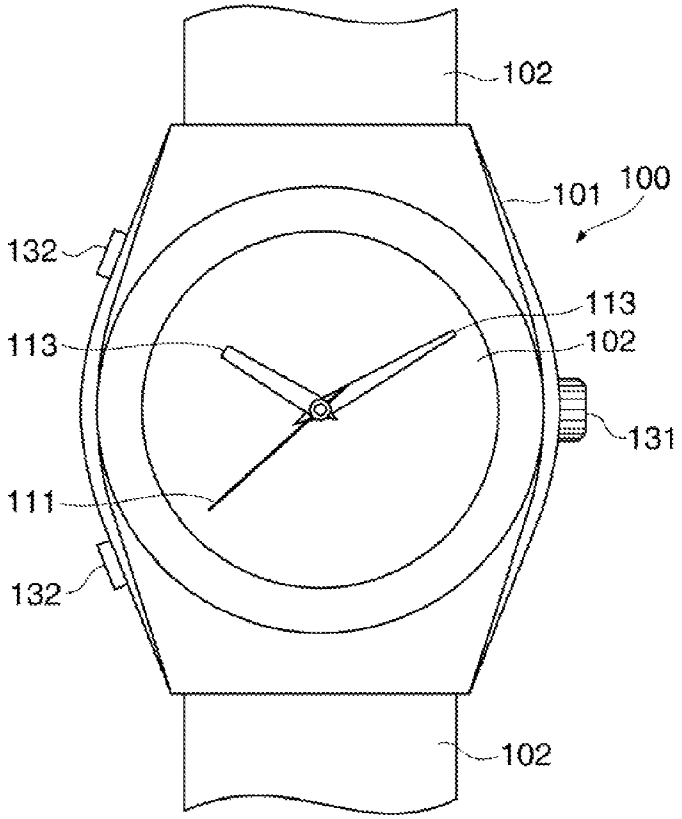
FIGS. 21A and 21B are diagrams illustrating a wristwatch including an electrophoretic display device according to an embodiment of the invention.
Figure 21B:
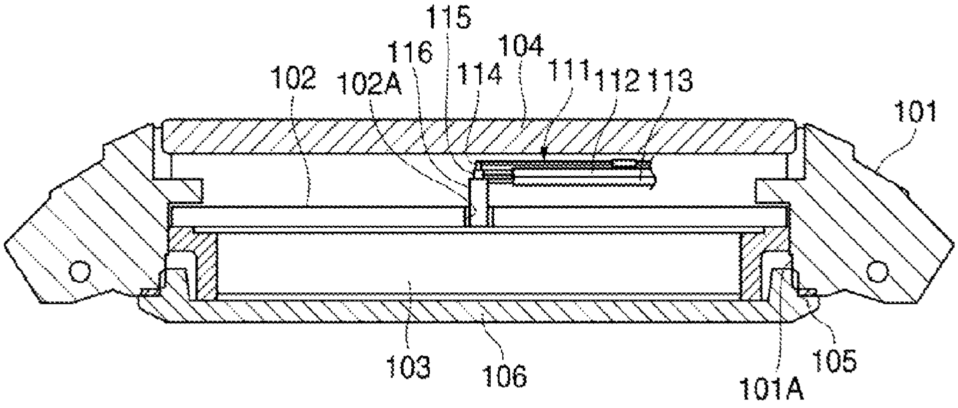

FIGS. 21A and 21B are diagrams illustrating a wristwatch 100 which includes the electrophoretic display device according to the embodiment of the invention. Referring to a front view of FIG. 21A, the wristwatch 100 includes a watch case 101 and a pair of bands 402 connected to the watch case 101.

On the front of the watch case 101, the electrophoretic display device 102 according to the embodiment of the invention, a second hand 111, a minute hand 112, and an hour hand 113 are provided. On the lateral of the watch case 101, a winder 131 serving as an operator, and one or a plurality of operating buttons 132 are provided.

Referring to a side sectional view of FIG. 21B, an accommodating portion 101A is provided inside the watch case 101. In the accommodating portion 101A, the electrophoretic display device 1 and a movement 103 are accommodated. At one end of the accommodating portion 101A (on the front of the watch), a transparent cover 104 made of glass or resin is provided. At the other end of the accommodating portion 101A (on the rear of the watch), a rear cover 106 is screwed through a packing 105, and the wrist case 101 is sealed by the transparent cover 104 and the rear cover 106.

The movement 103 has a hand moving mechanism (not shown) which is connected to the analog indicatory hands having the second hand 111, the minute hand 112, and the hour hand 113. The hand moving mechanism rotates the second hand 111, the minute hand 112, and the hour hand 113, and functions as a time display section which displays a set time.

The electrophoretic display device 102 is arranged on the movement 103 on the front of the watch and constitutes the display section of the wristwatch 100. In the central portion of the electrophoretic display device 102, a through hole 102A is formed to pass through the front and rear of the electrophoretic display device 102. The shafts of a second wheel 114, a center wheel 115, and a tubular wheel 116 of the hand moving mechanism of the movement 103 are inserted into the through hole 102A. The second hand 111, the minute hand 112, and the hour hand 113 are attached to the front ends of the shafts. Although in this embodiment, the display surface of the electrophoretic display device 102 is molded in a circular shape, the invention is not limited thereto. For example, the display surface of the electrophoretic display device 102 may be molded in other shapes, such as an octagon and a hexadecagon, may be molded.

The electrophoretic display device according to the embodiment of the invention may be applied to other electronic apparatuses.

Figure 22:
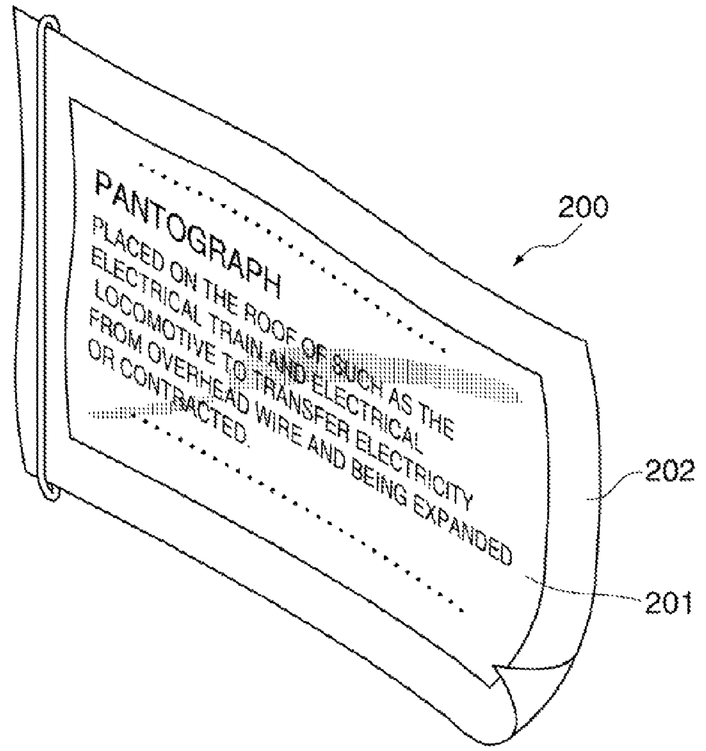
FIG. 22 is a perspective view showing an electronic paper including the electrophoretic display device according to an embodiment of the invention.

FIG. 22 is a perspective view showing an electronic paper 200 which includes the electrophoretic display device according to the embodiment of the invention. As shown in FIG. 22, the electronic paper 200 includes the above-described electrophoretic display device according to the embodiment of the invention as a display section 201. The electronic paper 200 has flexibility and includes a main body 202 which is formed of a sheet having the same texture and flexibility as typical paper and to be rewritable.

Figure 23:
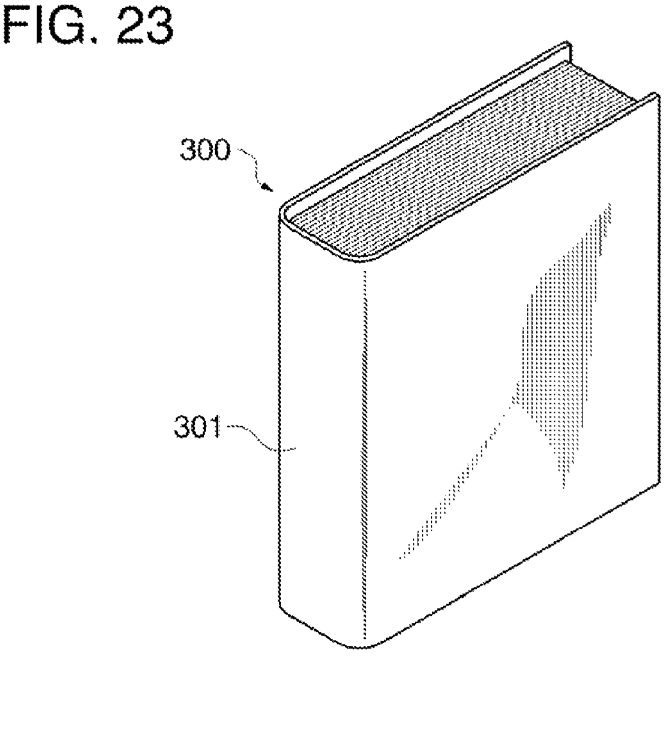
FIG. 23 is a perspective view showing an electronic note including an electrophoretic display device according to an embodiment of the invention.

FIG. 23 is a perspective view showing an electronic note 300 which includes the electrophoretic display device according to the embodiment of the invention. As shown in FIG. 23, the electronic note 300 is formed by binding a plurality of electronic paper sheets 200 shown in FIG. 23 so as to be sandwiched by a cover 301. The cover 301 includes a display data input unit (not shown) which inputs display data sent from, for example, an external apparatus. Thus, the display contents can be changed or updated in accordance with display data in a state where the electronic paper sheets are bound.

As described above, according to the wrist watch 100, the electronic paper 200, and the electronic note 300 described above, the electrophoretic display device according to the embodiment of the invention is provided, realizing various electronic apparatus having excellent display quality.

In addition, the configuration of the display section 20 is not limited to those shown in FIGS. 3 to 5. For example, the configuration of the electrophoretic element 65 is not limited to the configuration that includes a plurality of microcapsules and may be a configuration in which an electrophoretic dispersion medium and electrophoretic particles are included in spaces divided by a partition wall.

In addition, although in the foregoing embodiments, the dispersion medium of the elecrophoretic element 65 is a liquid body, the invention is not limited thereto. The dispersion medium may be a gaseous body.

The configuration of the invention is not limited to the foregoing embodiments, and various changes may be made without departing from the spirit and scope of the invention.

The entire disclosure of Japanese Patent Application No. 2010-091171, filed Apr. 12, 2010 is expressly incorporated by reference herein.

What is claimed is:

1. A method of driving an electrophoretic display device which includes a display section having a plurality of pixels containing electrophoretic particles of a first color and electrophoretic particles of a second color, the method comprising:

determining whether an average luminance of image data presently displayed in one or more predetermined regions on the display section is greater than or equal to a predetermined value, the one or more predetermined regions each having a plurality of pixels;

selecting, based on the determined average luminance of the image data presently displayed in the one or more predetermined regions on the display section, one of a first set of correction values based on a first luminance and a second set of correction values based on a second luminance as correction data for correcting a gray level for the one or more predetermined regions of input image data to be displayed on the display section;

correcting, based on the selected correction data, the gray level for the one or more predetermined regions of the input image data on the basis of one or more correction values corresponding to the gray level for the one or more predetermined regions of the input image data;

converting the input image data with the corrected gray level to a dithering pattern, in which the first color and the second color are combined, corresponding to the corrected gray level for each predetermined region of the input image data; and driving the electrophoretic particles of the first color and the electrophoretic particles of the second color on the basis of the input image data converted to the dithering pattern for the plurality of pixels in the display section.

2. The method according to claim 1, wherein the first set of correction values is generated on the basis of reflectance when each of a plurality of gray levels is displayed on the display section after the first color is displayed on the display section, and the second set of correction values is generated on the basis of reflectance when each of the plurality of gray levels is displayed on the display section after the second color is displayed on the display section.

3. The method according to claim 1, further comprising:

prior to the correcting of the gray level, causing one of the first color and the second color to be displayed in all of the plurality of pixels of the display section.

4. The method according to claim 1, wherein the first set of correction values comprises a first lookup table having a plurality of first correction values corresponding to a plurality of gray levels; and the second set of correction values comprises a second lookup table having a plurality of second correction values corresponding to the plurality of gray levels.

5. The method according to claim 4, wherein the plurality of first correction values is different than the plurality of second correction values.

6. The method according to claim 1, wherein the image data presently displayed in the one or more predetermined regions on the display section has the first luminance if the determined luminance is greater than or equal to the predetermined value and has the second luminance if the determined luminance is less than the predetermined value.

7. An electrophoretic display device comprising:

a display section which has a plurality of pixels containing electrophoretic particles of a first color and electrophoretic particles of a second color;

a gray level changing section which determines whether an average luminance of image data presently displayed in one or more predetermined regions on the display section is greater than or equal to a predetermined value, the one or more predetermined regions each having a plurality of pixels, selects, based on the determined average luminance of the image data presently displayed in the one or more predetermined regions on the display section, one of a first set of correction values based on a first luminance and a second set of correction values based on a second luminance as correction data for correcting a gray level for the one or more predetermined regions of input image data to be displayed on the display section, and corrects, based on the selected correction data, the gray level for the one or more predetermined regions of the input image data on the basis of one or more correction values corresponding to the gray level for the one or more predetermined regions of the input image data;

a dithering section which converts the input image data with the corrected gray level to a dithering pattern, in which the first color and the second color are combined, corresponding to the corrected gray level for each predetermined region of the input image data; and a display section driving section which drives the electrophoretic particles of the first color and the electrophoretic particles of the second color on the basis of the input image data converted to the dithering pattern for the plurality of pixels in the display section.

8. An electronic apparatus comprising:

the electrophoretic display device according to claim 7.

* * * * *